United States Patent [19]

Sikorski

[11] Patent Number: 4,884,948
[45] Date of Patent: Dec. 5, 1989

[54] DEFLECTABLE BLADE ASSEMBLY FOR A PROP-JET ENGINE AND ASSOCIATED METHOD

[75] Inventor: Siegfried Sikorski, Munich, Fed. Rep. of Germany

[73] Assignee: MTU Motoren-und Turbinen Union Munchen GmbH, Munich, Fed. Rep. of Germany

[21] Appl. No.: 174,781

[22] Filed: Mar. 29, 1988

[30] Foreign Application Priority Data

Mar. 28, 1987 [DE] Fed. Rep. of Germany ....... 3710321

[51] Int. Cl.$^4$ ................................................. F01D 5/30
[52] U.S. Cl. .................. 416/132 R; 416/240; 416/248
[58] Field of Search ............... 416/132 R, 240 R, 248, 416/229 A, 230 R, 226

[56] References Cited

U.S. PATENT DOCUMENTS

| | | | |
|---|---|---|---|
| 1,426,954 | 8/1922 | Brooks | 416/132 R |
| 2,595,829 | 5/1952 | Dean | 416/240 R |
| 2,690,810 | 10/1954 | Doussain et al. | 416/248 X |
| 2,920,868 | 1/1960 | Ackerman et al. | 416/248 X |
| 2,929,755 | 3/1960 | Porter | 416/248 X |
| 2,986,375 | 5/1961 | Stalker | 416/240 R X |
| 3,095,180 | 6/1963 | Clarke et al. | 416/248 X |
| 3,600,103 | 8/1971 | Gray et al. | 416/248 X |
| 3,614,260 | 10/1971 | Ellinger | 416/132 R X |
| 4,000,956 | 1/1977 | Carlson et al. | 416/248 X |
| 4,343,593 | 8/1982 | Harris | 416/229 A X |
| 4,784,575 | 11/1988 | Nelson et al. | 416/226 |
| 4,810,167 | 3/1989 | Spoltman et al. | 416/229 A |

FOREIGN PATENT DOCUMENTS

| | | | |
|---|---|---|---|
| 517285 | 7/1953 | Belgium | 416/248 |
| 1035313 | 7/1958 | Fed. Rep. of Germany | 416/240 R |
| 2532442 | 2/1976 | Fed. Rep. of Germany | 416/132 R |
| 19303 | of 1906 | United Kingdom | 416/132 R |
| 1211082 | 11/1970 | United Kingdom | 416/248 |
| 1323883 | 7/1973 | United Kingdom | 416/132 R |

Primary Examiner—Everette A. Powell, Jr.
Attorney, Agent, or Firm—Roberts, Spiecens & Cohen

[57] ABSTRACT

A propeller for a prop-jet engine having a propellor blade formed as a hollow shell member whose outer surface has an aerodynamic blade profile, the propeller blade being secured to a rotor via an adjustment pin. The hollow shell member is internally braced partly along its radial length by a flexible spar secured to the pin and made of thermoplastic material. The flexible spar is hollow and receives a metal spar hich is fixed to the pin and is given flexibility in bending by the provision of a slot therein.

22 Claims, 2 Drawing Sheets

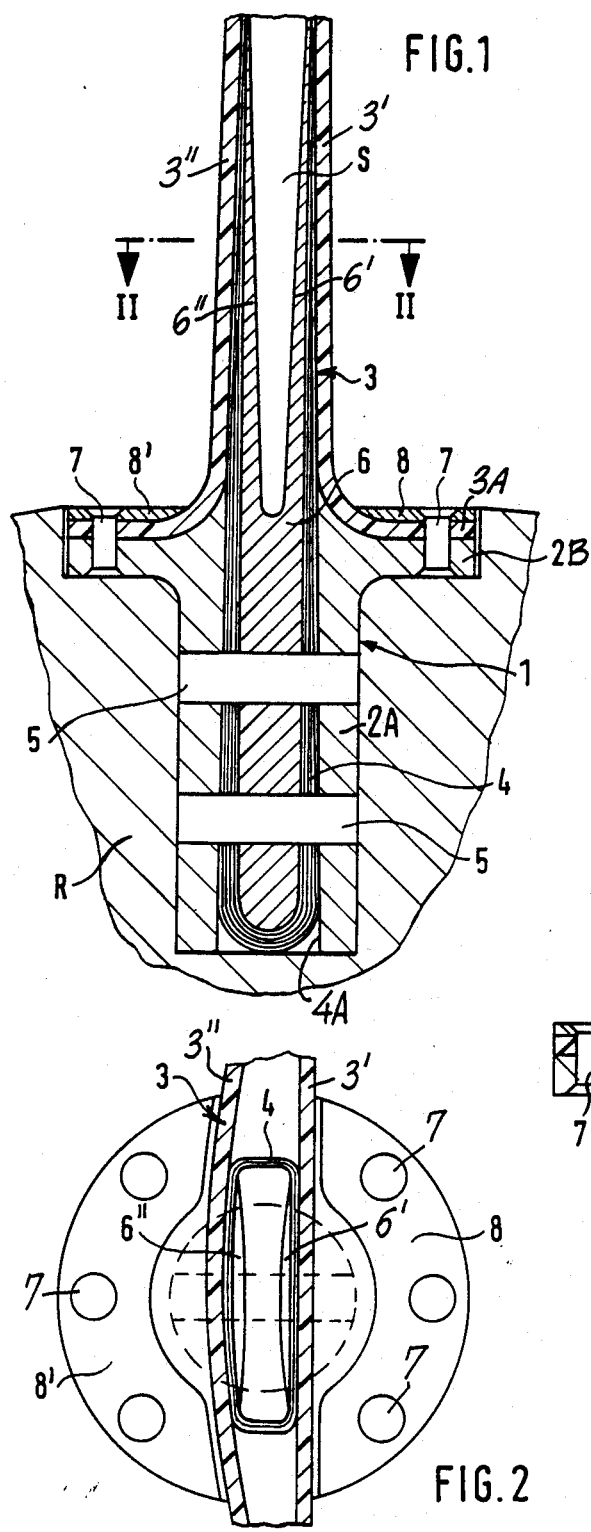
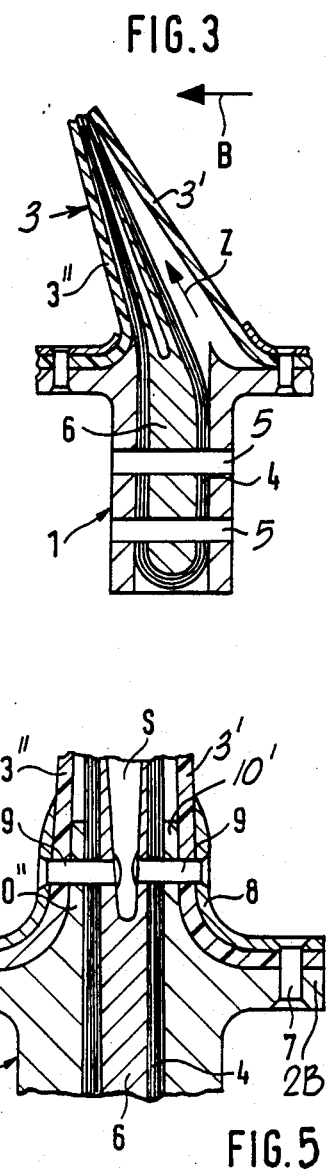

DEFLECTABLE BLADE ASSEMBLY FOR A PROP-JET ENGINE AND ASSOCIATED METHOD

FIELD OF THE INVENTION

The present invention relates to a blade assembly mounted in a rotor adapted for the construction of turbine blades, compressor blades and propellers. The blade assembly is especially useful for propellers in prop-jet engines.

The invention relates more particularly to a blade assembly in which the blade proper is formed of fiber-reinforced plastic material which is anchored to the rotor by a metal adjusting pin having a cylindrical shank and an enlarged head.

The invention also relates to a method of providing flexibility for a rotor blade so that it can elastically resist lateral impact force applied to the blade.

DESCRIPTION OF PRIOR ART

In gas turbine jet engines, the main part of the forward thrust is frequently developed by shrouded front or rear turbines of relatively large diameter. Consequently, the turbine blades are of correspondingly large length. Additionally, in single stage designs, relatively wide blades are required.

In order to adapt the engine output characteristic to the required variable thrust, the blades are supported for angular adjustment on the rotor to vary the blade pitch.

In current prop-jet engines, gas turbine systems are provided with unshrouded propellers at the rear of the engine and these propellers are of large diameter (up to about 4 meters), and are relatively wide. The propellers have an aerodynamic blade profile of complex geometrical shape and they are extremely thin, particularly in the outer radial sections. Axially the blades are tapered in the manner of an arrow and are curved, and in transverse cross-section they are of crescent shape.

A prop-jet engine with a rear driven individual propellor having propellor blade adjustment is disclosed in FRG Pat. DE-PS No. 3,304,417.

In FRG application DE-OS No. 3,611,792, there is disclosed a prop-jet engine with unshrouded propellors rotating in opposite direction mounted at the front of the engine.

Also known are prop-jet engines in which the propellors rotate in opposite directions and are provided with shrouds in order to be able to reduce noise and the diameter of the propellors. An advantage of the counterrotating propellors of a prop-jet engine is a high capacity of rotor load with maximum flow ratio and high efficiency.

The shape and arrangement of the blades have a substantial influence on the feasibility of gas turbine jet engines, and particularly prop-jet engines. In this respect, the following requirements can be satisfied or brought into accord with each other only with difficulty:

in the indicated types of engines, particularly in combination with propellors, relatively large blades of high individual weight are anticipated. In order to keep the tensile stresses at the root or base of the blades as low as possible, and thus minimize the local stresses on the adjustment mechanism and the adjustment pin, the weight of the blade must be minimized;

the danger of intrusion of foreign objects and particularly the impingement of birds must be capable of being sufficiently controlled, namely in the case of extreme load on the blade a dependable shut down of the engine should be possible without producing a number of damage parts; in such case it should be possible to minimize blade damage;

despite the complex shape of the blade and its extremely thin sections, the blade must be able to satisfy the operating requirements as to stiffness; any blade fluttering which occurs within the region of comparatively high natural flexural frequencies must be capable of being resisted;

replacement of individual blades or propellors must be as simple as possible.

The above requirements can not be satisfied by existing designs in which the blades are made of a fiber-reinforced plastic while the metallic pin which provides for angular adjustment is made of titanium. In order to achieve satisfactory attachment of the blade to the pin, they must be interengaged over a relatively large surface area and this requires the pin to extend deeply into the plastic blade. The blade is integrally attached to the pin by bonding the mating surfaces together.

This arrangement has the disadvantage of the use of a sensitive adhesive bonding agent between the titanium pin and the plastic material of the blade. Differences in thermal expansion and elasticity of the metal pin and plastic blade leads to relatively early fatigue failure of the bonded connection therebetween.

Furthermore, impact forces applied to the blade are not adequately resisted. In this respect, it has been found that fiber materials have a brittle property and tend to break when overloaded. The metallic pin must be made relatively large and extend in mushroom shape into the blade which leads to a comparatively high weight of the blade assembly.

SUMMARY OF THE INVENTION

An object of the invention is to provide a blade assembly suitable for a propellor of a prop-jet engine which will satisfy the requirements outlined above and particularly will be of comparatively light weight and capable of resisting lateral impact force, for example, from striking birds while being anchored in dependable operating fashion on the rotor.

The above object is satisfied in accordance with the invention by a deflectable blade assembly which comprises a metallic pin mountable in a rotor and including a shank and an enlarged head on the shank, and a hollow shell member secured to the head of the pin and projecting from the rotor, the shell member having an outer surface forming a blade having an aerodynamic profile and internally receiving a spar of fiber material which is inserted into a bore in the pin and is fixed to the pin. The spar projects from the pin to extend within the hollow shell member and supportively engage the shell member to permit the shell member to undergo elastic deformation upon application of lateral force thereto with bending of the shell member and the spar.

In accordance with the invention, two load paths are created, one of which resists the impact energy upon being struck by birds by separate bending of the blade and the fiber spar while the spar provides flexural elastic support within the blade, whereas the other load path is formed by the main connection which, even though the blade is laterally struck by birds, can resist all operating loads, at least for a short time interval.

A second spar is mounted within the first spar and is secured to the metal pin to elastically resist bending forces when the blade is struck laterally, for example, by a bird. The fiber spar bears laterally against the second spar and bends therewith while the hollow shell member bends and separates from the fiber spar at its root end to form a gap. In this way, impact forces are dissipated by elastic deflection without overloading the pin. By bending the second spar and producing separation of the shell member with the tension side of the first spar, the second spar resists the lateral forces applied to the blade with sufficient elasticity and prevents rupture of the fiber spar. The metallic pin which serves for rotatable mounting of the blade for angular adjustment and transmission of force to the rotor, internally receives the concentric fiber spar which extends into the interior of the shell member and transmits the centrifugal and aerodynamic forces to the rotor.

The fiber spar can be integrally secured to the adjustment pin by bonding and/or bolting. The second spar is made of metal and extends into the fiber spar for the transfer of force from the fiber spar to the pin and for a further increase of the bending strength in the vicinity of the pin. Preferably, the transition connection from the pin to the shell member should be suitably resilient, for example, by providing a slot of V-shape in the second spar to assure uniform introduction of force under flexural load.

BRIEF DESCRIPTION OF THE FIGURES OF THE DRAWING

The invention will be further described in detail with reference to the drawing, in which:

FIG. 1 is a radial section through a rotor blade assembly whose blade is broken in length and wherein only a portion of the rotor is illustrated;

FIG. 2 is a sectional view taken along line II—II in FIG. 1;

FIG. 3 is a view in radial section, on a smaller scale than FIG. 1, showing the blade assembly when a lateral impact force is applied thereto;

FIG. 5 is a fragment of a radial section of a further embodiment of a blade assembly.

DETAILED DESCRIPTION OF PREFERRED EMBODIMENTS

Figure 4:
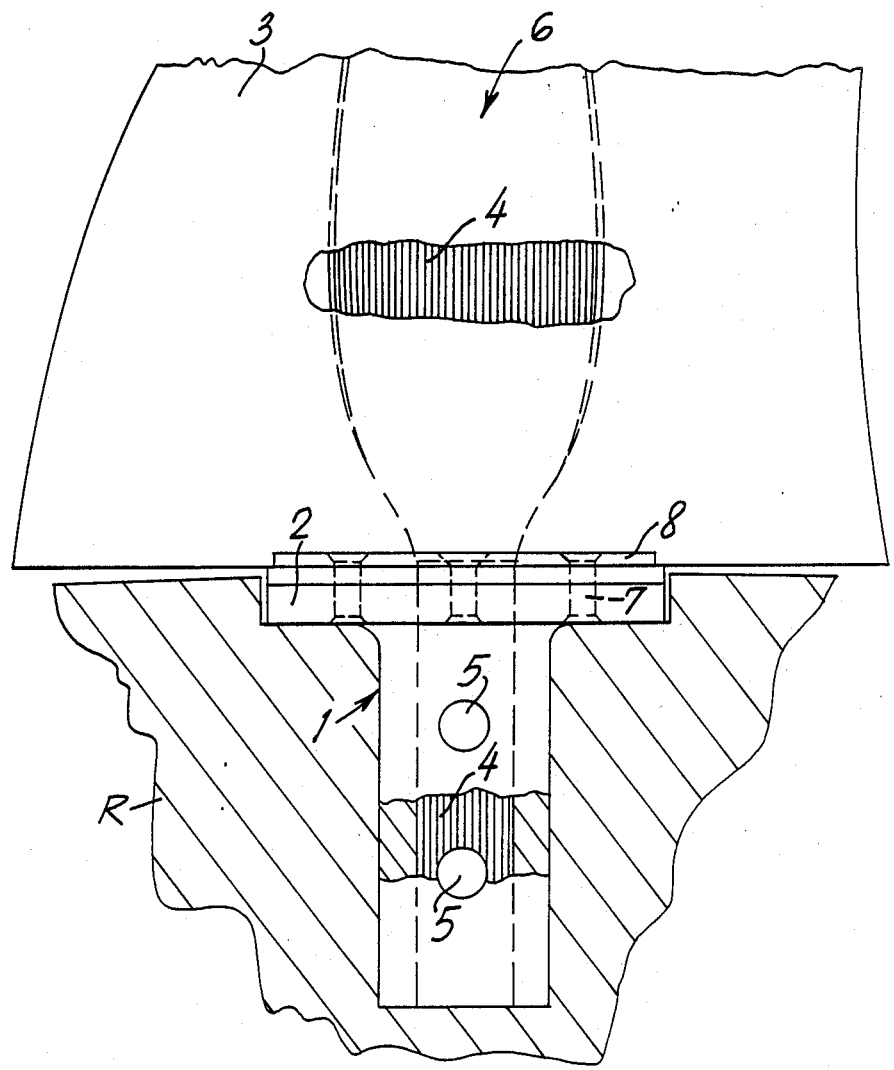
FIG. 4 is a side elevational view, partly broken away and in section, of the blade assembly as seen from the right in FIG. 2.

Referring to FIGS. 1, 2 and 4, there is shown a blade assembly for a propellor of a prop-jet engine. The blade assembly includes a metal pin 1 having a cylindrical shank 2A inserted in a rotor R and an enlarged head 2B on the shank. The shank 2A is angularly turnable in the rotor R to adjust the angle of the entire blade assembly to adapt the blade assembly to the desired magnitude of thrust to be developed. The means for angular adjustment of the pin 1 is entirely conventional and not shown in order not to obscure the features of the invention.

The blade assembly further includes a hollow shell member 3 which serves as the blade proper of the assembly and has an outer surface forming an aerodynamic blade profile. The shell member 3 is made of a thermoplastic material reinforced by fibers of carbon, glass, aromatic polyamides or combinations thereof. The shell member 3 is formed with a flared base portion 3A which conforms in shape to the head 2B of pin 1 and is superposed thereon. The shell member 3 has front and rear walls 3', 3" which form a space in the region of the pin 1 and which join together at the side edges of the blade.

A spar 4 of fiber material is coaxially secured within a bore 4A formed in the interior of pin 1 and spar 4 projects radially from the pin into the hollow shell member 3 where the spar slidably engages the inner surfaces of the walls 3', 3" without fixation. The spar 4 serves as an elastic, internal bracing support for the shell member 3. The spar 4 is hollow and is of approximately rectangular section (FIG. 2) where it engages within the shell member 3.

The spar 4 can preferably be manufactured as an integral part of the shell member 3. In such case, the rear wall 3" of the spar 4 is made integral with the shell member and the front wall 3' is unconnected to the spar 4.

A second spar 6, made of metal, is inserted into the interior of spar 4 and is secured in common therewith by bolts 5 to the shank 2A of pin 1. The spar 6 includes a portion 6A extending radially beyond the rotor which is made elastically deformable by providing a slot S in portion 6A which is V-shaped in transverse section as shown in FIG. 1. The slot S extends from the open free radial edge of portion 6A to a depth approximately at the level of the outer surface of the rotor R. The slot S forms opposite upstanding thin flexible wall portions 6', 6" which are respectively juxtaposed with side walls of spar 4.

A pair of shaped cover elements 8, 8' conform in shape to the base portion 3A of the shell member 3 and the head 2B of pin 1 and the cover elements are superposed on the base portion 3A and clampingly hold the shell member on the pin 1. Rivets 7 or other suitable fasteners secure the cover elements 8, 8', the base portion 3A and the head 2B together.

In a modified embodiment shown in FIG. 5, the pin 1 includes on head 2B an upstanding portion formed by spaced walls 10', 10" which extend radially beyond the surface of the rotor R. The walls 3' 3" of the shell member 3 are seated on the walls 10', 10" and are secured thereto by rivets 9 whereby an additional fastening means is provided between the shell member and the pin. The rivets 9 are mounted at a level to extend into slot S and thereby conjointly attach the walls 10', 10" of the upstanding portion of pin 1, the cover elements 8, 8', the walls 3', 3" of shell member 3 and spars 4 and 6.

In addition the spar 4 can be bonded to the adjustment pin 1.

As shown in FIGS. 1, 3 and 4, and applicable by analogy to FIG. 5, the spar 6 is secured to pin 1 by bolts 5, the spar 4 being interposed and secured between spar 6 and pin 1.

Although the shank 2A of pin 1 has been illustrated as directly engaged in a bore in rotor R, the shank 2A can be rotatably mounted in bushings or bearings in rotor R as is conventional in the art.

FIG. 3 shows the relation between the various elements of the blade assembly when a lateral force B is applied to the shell member 3, for example, by impact with a bird. The shell member 3 is bent rearwardly as a flexible cantilever beam with its tension side facing forwardly (to the right in FIG. 3). The wall 3' causes the spar 4 to flex rearwardly which in turn produces flexure of spar 6 and closure of slot S. Thereby, a local separation takes place between wall 3' and spar 4 in the root or base region of the shell member. The separation is illustrated at gap Z.

By vitrue of the above construction, the impact forces are effectively dissipated by elastic deformation of spar 4 as enabled by the flexibility of spar 6 due to slot S. The residual lateral force is transmitted to the adjustment pin 1 by the shell member 3, and the spars 4 and 6.

The spar 4 can be made essentially of carbon fibers having a comparatively high modulus of elasticity. The fibers can be embedded in an epoxide or polyimide-resin matrix.

The cover elements 8, 8' can also be made essentially of very tough fibers, particularly organic aromatic polyamide fibers (Aramid) or glass fibers.

As seen from the above, the invention provides for flexibility of the rotor blade to elastically resist lateral impact force on the blade by forming the rotor blade as a hollow shell member 3 with an outer surface forming an aerodynamic blade profile, securing the base end of the hollow shell member to the rotor through the intermediary of the pin 1 so that the shell member extends radially from the rotor, and internally bracing the shell member at said base end partly along the radial length thereof by spar 4, such that application of lateral force to the shell member will be resisted by elastic bending of the shell member and the spar. The spar 4 is made hollow and it is internally supported by the second spar 6 which has capability of undergoing elastic bending which in turn permits the first spar to undergo elastic bending. The first spar 4 and the shell member 3 can undergo differential elastic bending upon application of the lateral impact force with formation of gap Z between the shell member 3 and the spar 4.

Although the invention has been described in relation to specific embodiments thereof, it will become apparent to those skilled in the art that numerous modifications and variations can be made within the scope and spirit of the invention as defined in the attached claims.

What is claimed is:

1. A deflectable blade assembly for a prop-jet engine comprising a metallic pin mountable in a rotor and including a shank and an enlarged head on said shank, a hollow shell member secured to said head and projecting from the rotor, said shell member having an outer surface forming an aerodynamic blade profile, a first spar of fiber material fixed to said pin, said first spar projecting from said pin and being incorporated into said hollow shell member to supportably engage said shell member to permit said shell member to undergo elastic deformation upon application of lateral force thereto with bending of said shell member and said first spar, said spar defining a hollow interior, a second spar of metal fitted within the hollow interior of said first spar, and means securing said second spar to said pin.

2. A blade assembly as claimed in claim 1 wherein said first spar is integral with said shell member.

3. A blade assembly as claimed in claim 1 wherein said second spar includes an elastically deformable portion which extends into the interior of said shell member.

4. A blade assembly as claimed in claim 3 wherein said elastically deformable portion of said second spar is provided with a slot to provide the elastic deformability thereof.

5. A blade assembly as claimed in claim 4 wherein said second spar has a free end located within said shell member, said slot being of V-shape and widening towards said free end to open thereat.

6. A blade assembly as claimed in claim 5 wherein said shell member includes a base portion mounted on and conforming in shape to said head of said pin.

7. A blade assembly as claimed in claim 6 comprising cover elements mounted on said base portion of said shell member and including upward extension portions clampingly engaging said shell member.

8. A blade assembly as claimed in claim 7 wherein said shell member includes opposed spaced wall portions, said upward extension portions of said cover elements engaging against said spaced wall portions and secured thereto.

9. A blade assembly as claimed in claim 8 comprising attachment means securing said cover elements and said base portion of the shell member in common to said head of said pin.

10. A blade assembly as claimed in claim 7 wherein said pin includes a hollow upstanding portion on said head, said shell member being seated on said hollow upstanding portion.

11. A blade assembly as claimed in claim 10 comprising connection means fixedly connecting said shell member to said hollow upstanding portion.

12. A blade assembly as claimed in claim 11 wherein said connection means extends into said V-shaped slot of said second spar and jointly secures said cover elements, said shell member, and said first and second spars to said hollow upstanding portion of said pin.

13. A blade assembly as claimed in claim 1 wherein said connection means comprises rivets.

14. A blade assembly as claimed in claim 1 wherein said first spar is bonded to said pin.

15. A blade assembly as claimed in claim 1 wherein said means securing said second spar to said pin comprises bolt means, said first spar being engaged in form-locked manner between said second spar and said pin.

16. A blade assembly as claimed in claim 1 wherein said hollow shell member is made of plastic material reinforced by fibers of carbon, glass, polyamide or combinations thereof.

17. A blade assembly as claimed in claim 16 wherein said fibers are embedded in an epoxide or polyimide resin matrix.

18. A blade assembly as claimed in claim 1 wherein said first spar is made of carbon fibers having a relatively high modulus of elasticity.

19. A blade assembly as claimed in claim 18 wherein said fibers are embedded in an epoxide or polyimide resin matrix.

20. A blade assembly as claimed in claim 7 wherein said cover elements are made of titanium, aluminum or alloys thereof.

21. A blade assembly as claimed in claim 7 wherein said cover elements are made of aramid or glass fibers of high tensile strength.

22. A blade assembly as claimed in claim 1 wherein said first spar includes a portion which slidably supports said shell member without fixation such that upon bending of said first shell member and said spar, a gap is formed therebetween.

* * * * *